United States Patent [19]

Bok

[11] Patent Number: 4,465,165

[45] Date of Patent: Aug. 14, 1984

[54] BRAKE APPARATUS

[75] Inventor: Lowell D. Bok, Anna, Ohio

[73] Assignee: The B. F. Goodrich Company, New York, N.Y.

[21] Appl. No.: 461,899

[22] Filed: Jan. 28, 1983

[51] Int. Cl.³ .............................................. F16D 65/10
[52] U.S. Cl. ......................... 188/218 XL; 188/251 A; 192/107 R
[58] Field of Search ........... 188/73.2, 218 XL, 251 A, 188/251 R, 250 B; 192/107 R, 70.2

[56] References Cited

U.S. PATENT DOCUMENTS

| | | | |
|---|---|---|---|
| 3,605,967 | 9/1971 | Warren et al. | 188/218 XL |
| 3,934,686 | 1/1976 | Stimson et al. | 188/218 XL |
| 4,083,434 | 4/1978 | Pinter | 188/218 XL |
| 4,249,642 | 2/1981 | Anderson et al. | 188/218 XL |

FOREIGN PATENT DOCUMENTS

WO80/00735 1/1980 PCT Int'l Appl. .......... 188/218 XL

Primary Examiner—Bruce H. Stoner, Jr.
Assistant Examiner—Alvin E. Oberley
Attorney, Agent, or Firm—Joseph Januszkiewicz

[57] ABSTRACT

A friction brake assembly for use with axially aligned rotor brake discs that are interleaved with stator brake discs. The rotor discs have a plurality of circumferentially spaced slots along their inner periphery. The slots opposite side walls are beveled and are complimentarily engaged by the beveled legs of a U-shaped insert. The inserts transfer the load and stresses to the full beveled faces of the slots while held in place by overlying clips which are fastened to the discs.

8 Claims, 3 Drawing Figures

BRAKE APPARATUS

BACKGROUND OF THE INVENTION

This invention relates to friction braking systems and more particularly to aircraft friction discs with reinforced peripheral slots for use in multiple disc brakes.

In brake assemblies which employ a plurality of brake discs alternately splined to the wheel and axle of an aircraft, it is important to provide reinforced peripheral slots to the discs to relieve the severe stressing at these splined junctures. Formerly when the disc brakes employed discs of steel construction, the discs were able to withstand the shearing and compressive forces exerted thereon between the slots and the torque transmitting members. With the replacement of the steel discs with carbon composition discs it was important to provide reinforcing inserts at the peripheral slots since the carbon composites have less strength than steel. The inserts transmit the forces to the carbon discs, over a larger area reducing the contact stresses which increases the load capability of the carbon.

Some friction discs with reinforced inserts at the slots do not adequately transfer the load. In some structures the load is transmitted via radially disposed pins to the carbon discs. These discs require precise machining for the placement of the radial holes while simultaneously weakening the discs due to the removal of substantial material along the entire radial wall. In some structures the inserts for the peripheral reinforced slots transmit the forces to the insert rivets and then to the openings in the disc through which the rivets extend. These openings accept all of the discs loading and are therefore subject to undesirable very high stress concentrations. The brake disc problems relate equally well to clutches. The present invention utilizes an insert at the peripheral slots that engages the carbon disc and drives on the rotating member or transfers the stress to the stationary member without deleterious effects on the carbon composite materials. The insert has a pair of opposed faces which diverge to distribute the load providing an angle drive. A separate cap or clip is used to retain the inserts in position. Such structure eliminates peeling or fraying of the carbon composite heat sink material. The angle drive, when loaded, seats firmly against the carbon. The horizontal load due to misalignment between the wheel and brake are compensated for by the side component of the angle drive. The angle drive system allows the insert to float freely in the slot of the carbon disc thereby eliminating the loading of the attaching rivets.

SUMMARY OF THE INVENTION

A friction brake disc assembly wherein the annular shaped discs have a plurality of circumferentially spaced slots along the periphery. The respective side walls of the slots have beveled surfaces that are complimentarily engaged by similarly contoured inserts to distribute the stress and load. The inserts are retained in their respective slots by overlying clips permitting the inserts to float within their respective slots.

DESCRIPTION OF THE PREFERRED EMBODIMENT

Figure 1:
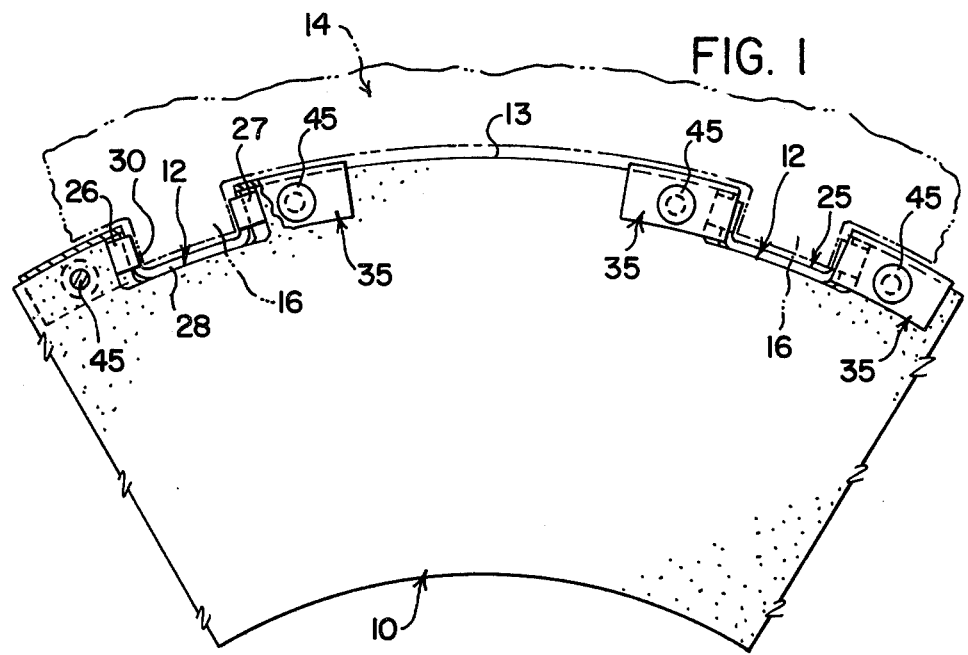
FIG. 1 is a fragmentary side elevational view of a brake disc assembly with a key slot insert secured to the respective peripheral slots by inserts or caps.
Figure 2:
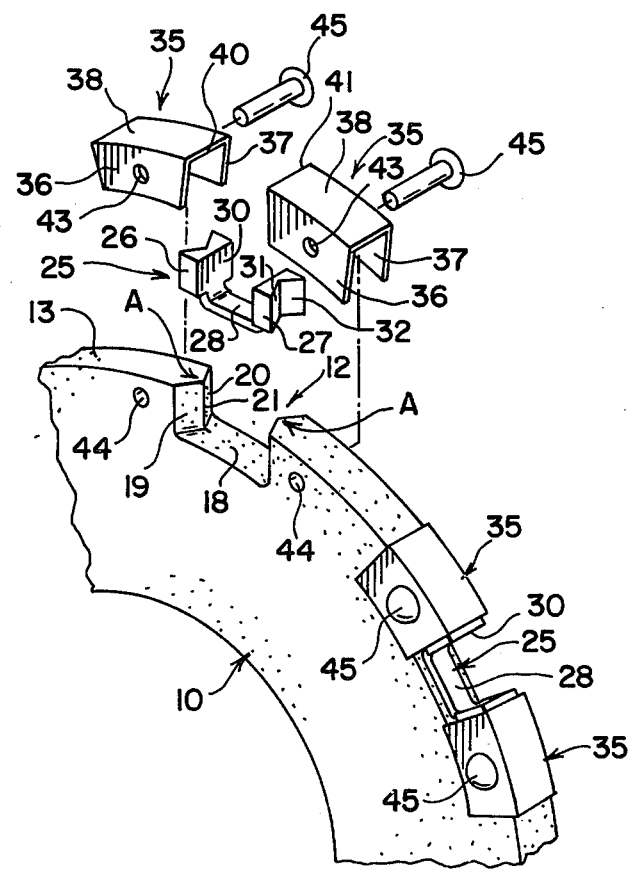
FIG. 2 is an exploded perspective view of the insert and cap in relation to a perspective view of a fragmentary portion of a rotor brake disc.

Referring to the drawings, wherein like reference numerals designate like or corresponding parts throughout the several views, there is shown in FIG. 1 a friction brake disc 10 in the form of a rotor of a multiple disc aircraft brake. Although only a portion of one rotor disc is shown, it is understood that multiple discs refers to the plurality of axially spaced-apart annular rotor discs which are suitably splined for axial movement along a mating key or spline that is part of the rotating wheel. The plurality of annular rotors are interleaved with annular stator discs which in turn are suitably splined for axial movement along a mating key member or members that is fixedly secured to a torque tube not shown since the invention lies in the insert and cap for the discs only. Disc 10 is an annular member having flat annular wall surfaces with an inner and an outer periphery. As seen in FIGS. 1 and 2, disc 10 has a plurality of circumferentially spaced slots 12 along its outer periphery 13.

The disc 10 is fabricated from a carbon material such as bulk graphite or carbon fabric composite as disclosed in U.S. Pat. No. 3,936,552.

A torque device 14 (shown in phantom lines in FIG. 1) is located adjacent to the outer periphery of the discs 10 (only a portion of one shown in FIG. 1). Torque device 14 has a plurality of splines, ribs or disc engaging members 16 projecting into slots 12 to provide a means for applying a load or force on the disc 10 by its engagement with slot 12. Slot 12 has a bottom surface 18, and two radially disposed beveled side walls or side wall portions. One beveled side wall has a side wall face 19 and a side wall face 20 with a radially extending linear junction line 21. The other beveled side wall has two similar side wall surfaces or faces. The respective oppositely disposed side wall faces subtend an angle of approximately 120 degrees, which in FIG. 2 is designated A. Each pair of faces diverge to form a wedge shaped abutment or a V-shaped projection which in effect tapers the respective faces to provide such V-shaped contour. The word taper refers to diminution of thickness or width of an object.

A metal insert 25 is located within slot 12. Each insert 25 has a pair of spaced leg or sides 26 and 27 interconnected by a bridging section 28. Bridging section 28 is of narrower width than the sides 26 and 27. The bottom surface of the bridging section 28 is in abutting contact with the bottom surface 18 of slot 12. Sides or leg 26 of the U-shaped insert 25 has its outer end portions grooved or beveled at a 120 degree included angle such as to compliment the beveled side wall surfaces or V-shaped projections 19 and 20 of slot 12 and to be in frictional abutting contact with such wall surfaces. The inner wall surface of side 26 of the U-shaped clip is a flat wall surface 30 for engagement by one of the ribs 16 of the torque device 14. Side 27 of the U-shaped clip portion is similar to side 26 having an outer beveled surface or V-shaped groove with faces 31 and 32 complimentary to the beveled side wall portions of slot 12. Thus the U-shaped insert with sides 26 and 27 fits snugly into the slot 12 such that the included angle between the outer surfaces of the insert distribute the load into the carbon disc 10 whereby the forces tend to compress the layers of the carbon cloth together eliminating peeling or fraying of the carbon composite heat sink material of which the disc 10 is composed of. This feature enhances the life of such carbon discs.

The U-shaped insert 25 is held in position on the carbon disc 10 by a pair of spaced U-shaped members, clips or caps 35. Cap 35 has a pair of laterally spaced leg 36 and 37 interconnected by a cross piece 38. The cross piece 38 is arcuately in shape such that the bottom surface of the cross piece comes into abutting contact with the top surface of disc 10 adjacent to the slot 12. The top surface of disc 10 is a continuous circumferentially extending arcuate surface, interrupted by the slots 12 but since the disc is rather large, the arcuate shape is a gentle curve. The respective ends or edges 40 and 41 of the cross piece 38 are linear. The respective laterally spaced legs 36 and 37 of each cap 35 have bores 43 extending therethrough which bores are placed in alignment with corresponding bores 44 in the peripheral portions of the disc 10 and are fastened thereto by rivets 45. By using the beveled contoured surface of side walls 19 and 20 as the means for transferring the drive forces, which in effect can be referred to as an angle drive system, the insert or U-shaped insert 25 floats freely in the slot 12 of the carbon disc thereby eliminating loading of the attaching rivets 45. On attaching the caps 35 onto disc 10 to secure the U-shaped inserts within the slot 12, the respective edges 41 and 40 of the pair of caps 35 lie closely adjacent to the respective flat wall surface 30 as seen in FIG. 2.

Stator discs, suitable for use in aircraft multiplate disc brakes is referred to above, can also be provided with torque-transmitting inserts in a similar manner to the rotor construction described above.

Figure 3:
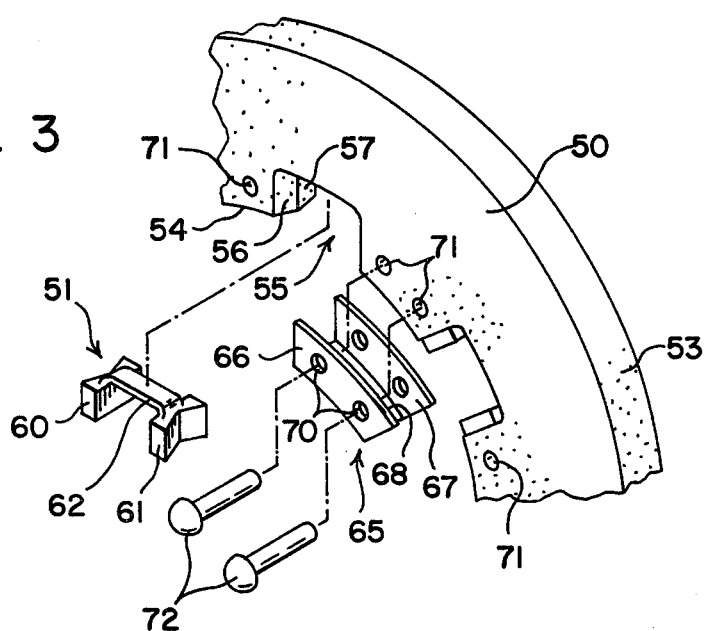
FIG. 3 is an exploded perspective view of the insert and cap in relation to a perspective view of a fragmentary portion of a stationary brake disc.

FIG. 3 discloses part of an annular surface of a stator brake disc 50 provided with torque transmitting inserts 51 identical to metal insert 25. The stator brake disc 50 is one of a plurality of stator discs 50 that are interleaved with the annular rotor discs 10. Stator discs 50 are suitably splined for axial movement along a mating key member that is fixedly secured to a stationary torque tube not shown. See U.S. Pat. No. 3,970,174 for a more detailed showing of the auxiliary structures that are cooperative with the stator & rotor brake discs disclosed and described.

Stator disc 50 has an outer peripheral surface 53 and an inner peripheral surface 54. The inner periphery of disc 50 has a plurality of circumferentially spaced slots 55 with a slightly arcuate bottom surface and two oppositely disposed beveled wall surfaces. Such bottom surface may be linear. The beveled wall surfaces are identical and similar to the slots 12 of disc 10. As seen in FIG. 3, the one beveled wall surface has side wall surfaces or faces 56 and 57 with a 120 degree included angle therebetween as in slot 12. The side wall surface opposite faces 56 and 57 is similarly constructed. Such side walls provide a wedge shaped abutment or projection.

Insert 51, located within each slot 55, has a U-shaped configuration with spaced legs or sides 60 and 61 interconnected by a bridging section 62. Bridging section 62 is of narrower width than the respective sides 60 and 61. The respective outer wall surfaces of sides 60 and 61 are beveled inwardly or grooved as seen in FIG. 3 to provide an included angle of 120 degrees. The beveled outer wall surfaces of sides 60 and 61 match the beveled wall surfaces of the slot 55 to distribute the load to the carbon stator discs 50 eliminating peeling or fraying of the carbon composite of which the discs 50 are made of.

The U-shaped inserts 51 are held in position on the carbon discs 50 within the slots 55 by a plurality of circumferentially spaced U-shaped caps, clips or members 65. As seen in FIG. 3, each insert 51 is retained in position by a pair of caps 65 wherein the forward portion of each cap 65 overlies a portion of the insert 51. Each cap 65 has a pair of laterally spaced legs 66 and 67 interconnected by a cross piece 68. The general contour of the legs 66 and 67 as well as the cross piece 68 is slightly arcuate to conform to contour of the mating inner and side edges of the disc 50. The respective laterally spaced legs 66 and 67 have bores 70 which are in alignment with corresponding circumferentially spaced bores 71 in stator disc 50. The caps 65 are fastened to the discs 50 by rivets 72 thereby retaining the inserts 51 in position in the respective slots 55.

In the operation of the discs 10 and 50 in multiple disc brakes, the splines 16 of torque device 14 extends into slots 12 of the axially aligned rotor brake discs 10. The axially aligned stators 50 interleaved between the annular axially aligned and axially spaced rotor discs 10 are suitably splined for axial movement along a mating key member that is fixedly secured to a stationary torque tube and is subject to being moved axially by suitable actuators such as a piston. When the brakes are applied, the rotor discs 10 and the stator discs 50 are axially squeezed together. The frictional forces between the faces of the rotor discs and the stator discs creates a load at the slots 12 and 55 as they bear against the ribs or splines 16 and the mating key members of the stationary brake discs 50. This load is transmitted to the sides or legs of the U-shaped inserts which inserts via their beveled faces exert a force directly on the walls or beveled faces 19 and 21 of slot 12 and beveled faces 56 and 57 of slot 55. No torque load is transmitted from the inserts to the caps and their rivets but rather distributed evenly over broader beveled faces of the carbon discs. The beveled interacting faces distributes the load into the carbon such that the forces tend to compress the layers of carbon cloth together eliminating peeling or fraying of the carbon composite heat sink material of the brake discs. When the torque load is transmitted from the beveled faces of the inserts to the beveled faces of the discs, the inserts seat firmly against the carbon discs and if there any misalignment between the wheel and brakes, the horizontal loads are taken out on the side component of the angle or beveled drive. The angle drive system as described allows the inserts to float freely in the slots 12 and 55 of the carbon brake discs thereby eliminating loading of the attached rivets.

Various modifications are contemplated and may obviously be resorted to by those skilled in the art without departing from the described invention as hereinafter defined by the appended claims, as only a preferred embodiment thereof has been defined.

I claim:

1. In a friction brake disc having a pair of annular flat wall surfaces, an inner peripheral wall surface, and an outer peripheral wall surface; said disc having a plurality of circumferentially spaced slots along the outer periphery disposed for engagement by a spline of a torque device; each of said slots having two generally radially extending wall portions and a bottom surface extending between and interconnecting said wall portions; each of said wall portions having a pair of adjacent faces that diverge towards said annular flat wall surfaces to define a wedge shaped abutment; an insert located within each of said slots for reinforcing said slots; each of said inserts having a general U-shaped contour with two spaced legs; said legs being beveled to cooperate by engaging said faces of adjacent slots to transfer the forces from said spline; a plurality of clips fastened to said discs; and each leg of each insert having a portion thereof covered by a portion of one of said clips to retain said inserts within said slots.

2. A friction brake disc as set forth in claim 1 wherein each of said clips are U-shaped and straddle the periphery of said inserts to retain said inserts within said slots.

3. A friction brake disc as set forth in claim 2 wherein said wedge shaped abutment defines an included angle between 90 and 140 degrees.

4. A friction brake disc as set forth in claim 3 wherein said bevel on said legs is at the same angle as said included angle to provide full contact between all of the surfaces of said beveled legs and adjacent faces of said wall portions of said slots.

5. In a friction brake disc having a periphery containing a plurality of circumferentially spaced slots disposed for engagement by a spline of a torque device, each of said slots having two generally radially extending wall portions and a bottom surface extending between and interconnecting said wall portions, each of said wall portions of each slot having a pair of adjacent V-shaped projections that extend inwardly toward each other to define a pair of faces, each of said pair of faces intersect to define a radially extending puncture, an insert located within each of said slots for reinforcing each of said slots, each of said inserts having a pair of laterally spaced legs and a bridging section, each of said bridging sections lying along said bottom surfaces of said slots, each of said legs having an outer portion and an inner portion, each of said outer portions having a V-shaped groove that cooperatively engages adjacent faces of said V-shaped projections within which said insert is located, clip means straddling the periphery of said disc and a portion of one of said legs to confine said insert within said slot.

6. A friction brake disc as defined in claim 5 wherein said clip means is a U-shaped member having a portion thereof overlying a straddling adjacent ones of said legs of said inserts to frictionally retain said inserts within said slots.

7. An annular brake disc made from a carbon composite material having a plurality of circumferentially spaced slots around one periphery thereof, each of said slots having a bottom surface and two side walls, an insert located within each of said slots, a plurality of circumferentially spaced cap members mounted around said one periphery of said discs adjacent to said slots, each of said cap members overlying a portion of said slot to thereby confine said inserts in said slots, each of said side walls of said slots contains a pair of faces that taper towards the opposite side wall presenting a wedge shaped abutment, and the outer walls of said inserts are grooved to complimentarily engage said wedge shaped abutment.

8. An annular brake disc as set forth in claim 7 wherein said outer grooved walls of said inserts contain flat faces that convert to define a V-shaped groove that abuttingly engages one of said wedge shaped abutments.

* * * * *